F. F. LANDIS.
CENTRIFUGAL GRAIN SEPARATOR.
No. 11,632. Reissued Oct. 5, 1897.
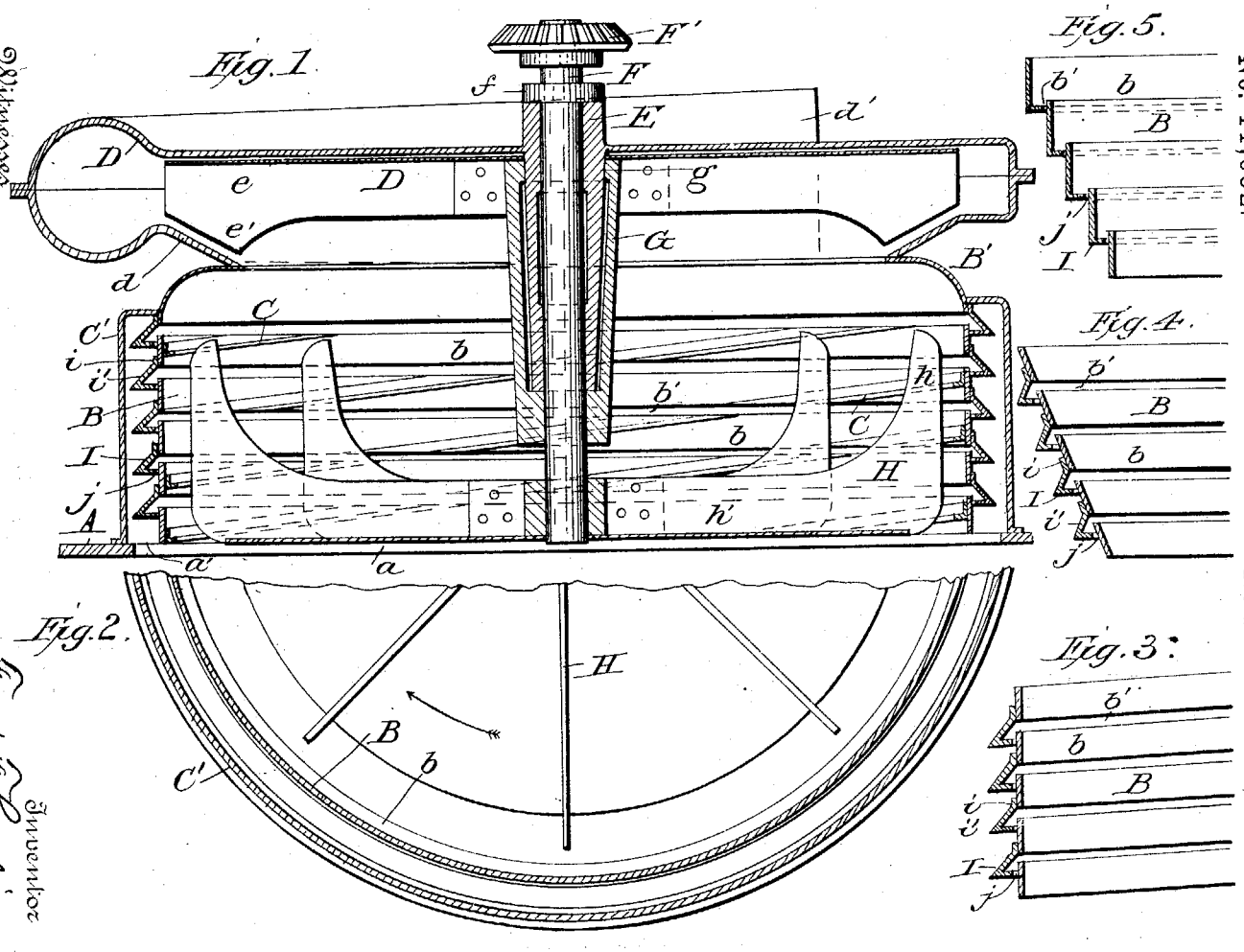
Witnesses
F. L. Durand
J. E. Bates
Inventor
Frank F. Landis,
per E. W. Bradford
Attorney

UNITED STATES PATENT OFFICE.

FRANK F. LANDIS, OF WAYNESBOROUGH, PENNSYLVANIA.

CENTRIFUGAL GRAIN-SEPARATOR.

SPECIFICATION forming part of Reissued Letters Patent No. 11,332, dated October 5, 1897.

Original No. 551,496, dated December 17, 1895. Application for reissue filed April 29, 1897. Serial No. 634,493.

*To all whom it may concern:*

Be it known that I, FRANK F. LANDIS, a citizen of the United States, residing at Waynesborough, in the county of Franklin and State of Pennsylvania, have invented certain new and useful Improvements in Centrifugal Grain-Separators; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to centrifugal grain-separators; and it consists in the novel construction and combination of parts hereinafter fully described and claimed.

In the drawings, Figure 1 is a vertical section through the center of the grain-separator. Fig. 2 is a partial sectional plan view. Figs. 3, 4, and 5 are detail vertical sections of portions of the separating-chamber, showing modifications in its construction.

A is a base-plate provided with an inlet-opening *a*.

B is a circular separating-chamber supported over the opening *a*, leaving an annular space *a'* between its periphery and the edge of the opening *a*.

The separating-chamber B is formed of a series of superposed rings *b*, having circumferential passages or spaces *b'* between them. These rings may be variously constructed in carrying out this invention. In Fig. 1 the rings are cylindrical and are arranged horizontally. In Fig. 3 the rings are a series of cylindrical and spiral convolutions. In Fig. 4 the rings are conical and are arranged horizontally. In Fig. 5 the rings are cylindrical and horizontal, but are arranged in conical form. In Fig. 1 the rings *b* are provided with spiral straw-guides C, secured to their inner surfaces.

The top portion B' of the chamber B is preferably curved inwardly.

C' is an outer casing encircling the separating-chamber B.

D is the casing of the discharger D'. This casing D is secured to the top of the chamber B and is preferably provided with a conical throat-piece *d* and a delivery-pipe *d'*.

E is a bearing formed integral with or otherwise secured to the casing D and depending centrally within the separating-chamber.

F is a shaft journaled in the bearing E and provided with a collar *f*, resting on the upper end of the said bearing.

F' is a driving wheel or pulley secured to the top portion of the shaft F.

The discharger D' is provided with radial arms *e*, preferably having projections *e'*, which run in the throat-piece *d*. The discharger-arms are secured to a long hub G, which is secured to the shaft F below the bearing E. This hub encircles the bearing E and is provided with a bearing *g*, which is journaled on the upper part of the bearing E.

H are radial arms secured to the lower portion of the shaft F, having projections *h* arranged substantially parallel to the periphery of the separating-chamber. A disk *h'* is mounted on the lower side of said arms of less diameter than that of the chamber B, leaving the entrance to said chamber annular in form and close to its periphery, which insures the straw being fed thereto in a thin annular stream, best suited for the purpose.

The separating-chamber is provided with substantially horizontal lips I for catching the grains. These lips are preferably made in the form of rings, each having a flange *i* for securing it to the lower part of a ring *b*, and an inclined portion *i*, encircling the space *b'* below the said ring and having the lip proper projecting inwardly from its lower edge a little below the upper edge of the ring *b* next below in the series. Said portions *i'* serve as arresting-plates outside the opening *b'* and prevent short pieces of straw, &c., from being thrown through said openings into the space outside the chamber and becoming mingled with the grain.

In the modification shown in Fig. 3 the lips I are formed of continuous spirally-arranged rings or convolutions conforming to the spiral convolutions or rings of which the chamber B is formed. In the modification shown in Fig. 5 the lips I are formed on the bottom edges of the rings *b*. An annular passage *j* is formed between each lip and the periphery of the ring or convolution next below the ring to which the said lip is secured. The lips may be formed integral with the rings in all the forms, if desired, instead of being secured to them by flanges.

The operation of the machine is as follows: The straw, after passing through the threshing mechanism of any approved construction (such as shown in my Patents Nos. 551,494 or 551,495) and having most of the grains removed from it, is conducted to the opening *a*. The discharger, which is caused to revolve rapidly, draws a current of air through the machine and causes the straw to enter the separating-chamber and pass upwardly through it. The revolving arms whirl around the straw in the chamber and the grains are driven out of it by centrifugal force. The straw is assisted in its upward passage through the separating-chamber by the spiral guides C. (Shown in Fig. 1.) The spiral arrangement of rings or convolutions shown in Fig. 3 and the conical form of the separating-chamber, as shown in Figs. 4 and 5, also effect a similar purpose and constitute guiding devices which assist the straw rising in the separating-chamber. The grains which are driven out of the straw by centrifugal force pass through the passages *b'* between the rings *b* and fall upon the lips I. The chaff does not pass through the passages *b'* because of the air which is drawn upwardly through the said passages by the discharger. When the grains accumulate on the lips I, they slide off the piles of grains on the said lips and drop through the spaces between the outer casing and the separating-chamber. When any short pieces of straw are projected through any one of the passages *b'*, they strike the portions *i'* and the pile of grain and are arrested thereby, and are then driven back by the upward current of air. The straw is turned over by the curved top portion of the separating-chamber, so that all the grains may fall out of it, and the revolving arms reduce the straw to a very loose condition. The straw is drawn through the throat-piece by the discharger and is discharged out of the delivery-pipe.

What I claim is—

1. The combination, with a cylindrical grain-separating chamber having an inlet-opening for straw at its bottom and formed of a series of superposed rings having passages between them and lips arranged below the said passages, of means for whirling around the straw in the chamber, substantially as set forth.

2. The combination, with a cylindrical grain-separating chamber having an inlet-opening for straw at its bottom and formed of a series of superposed rings having passages between them and lips arranged below the said passages, of means for whirling around the straw in the chamber, and guiding devices for causing the straw to pass upwardly through the chamber, substantially as set forth.

3. The combination, with a cylindrical grain-separating chamber having an inlet-opening for straw at its bottom and formed of a series of superposed rings having passages between them and lips arranged below the said passages, of a discharger arranged on top of the said chamber and operating to draw a current of air through it and through its passages, and means for whirling around the straw in the chamber, substantially as set forth.

4. The combination, with a cylindrical grain-separating chamber having an inlet-opening for straw at its bottom and formed of a series of superposed rings having passages between them, of rings having inclined portions encircling the said passages and inwardly-projecting lips at their lower edges, and means for whirling around the straw in the chamber, substantially as set forth.

5. The combination, with a cylindrical grain-separating chamber formed of superposed rings having passages between them and lips arranged below the said passages, of guides secured spirally to the inner surfaces of the said rings, and means for whirling around the straw in the said chamber, substantially as set forth.

6. The combination, with a cylindrical grain-separating chamber formed of a series of superposed rings separated by circumferential passages and provided with an inwardly-curved portion at its top; of a centrifugal discharger arranged above the said chamber, and means for whirling around the straw in the said chamber, substantially as set forth.

7. The combination, with a base-plate provided with an inlet-opening, and a cylindrical grain-separating chamber provided with circumferential passages and supported over the said opening, an annular space being left between the periphery of the said chamber and the edge of the said opening; of an outer casing encircling the said chamber and opening, and means for whirling around the straw in the said chamber, substantially as set forth.

8. The combination, with a centrifugal grain-separating chamber, and a discharger-casing provided with a long bearing depending centrally in the said chamber; of a shaft journaled in the said bearing, radial arms secured on the shaft in the separating-chamber, and a discharger provided with radial arms in its said casing, and having a long hub secured on the said shaft, encircling the said bearing and provided with a bearing journaled on the upper part of the aforesaid bearing, substantially as set forth.

9. In a threshing-machine, a separating-chamber having openings in its sides, which openings are covered by arresting-plates a short distance outside thereof between said chamber and the surrounding casing, and means for creating a centrifugal action in said chamber, substantially as set forth.

10. The combination with a separating-chamber formed with openings in its sides, of arresting devices on the outside thereof between said chamber and the surrounding casing, means for creating centrifugal action therein, and a discharger connected with its top, substantially as set forth.

11. The combination of a separating-chamber formed with annular openings in its sides, a ring connected to the bottom of each section and extending down over the opening between it and the next section a short distance outside said chamber, and means for creating centrifugal action in said casing, substantially as set forth.

12. A separating-chamber provided with annular openings, rings extending down over said openings outside its casing formed with inturned lower edges, and means for creating centrifugal action in said chamber, substantially as set forth.

13. The combination, with the separating-chamber, formed with openings in its sides, of arresting devices arranged opposite said openings outside said chamber, with spaces between them, and means for creating centrifugal action in said chamber, substantially as set forth.

In testimony whereof I affix my signature in presence of two witnesses.

FRANK F. LANDIS.

Witnesses:
T. B. SMITH,
T. S. CUNNINGHAM.